June 2, 1936.  A. L. WARD ET AL  2,043,084
PRODUCTION OF ELEMENTAL SULPHUR FROM HYDROGEN SULPHIDE AND SULPHUR DIOXIDE
Filed Jan. 23, 1933   4 Sheets-Sheet 1

WITNESS:
Robt R Kitchel.

INVENTORS
Alger L. Ward,
Claude W. Jordan and
Charles G. Milbourne
BY
Augustus B. Stoughton
ATTORNEY.

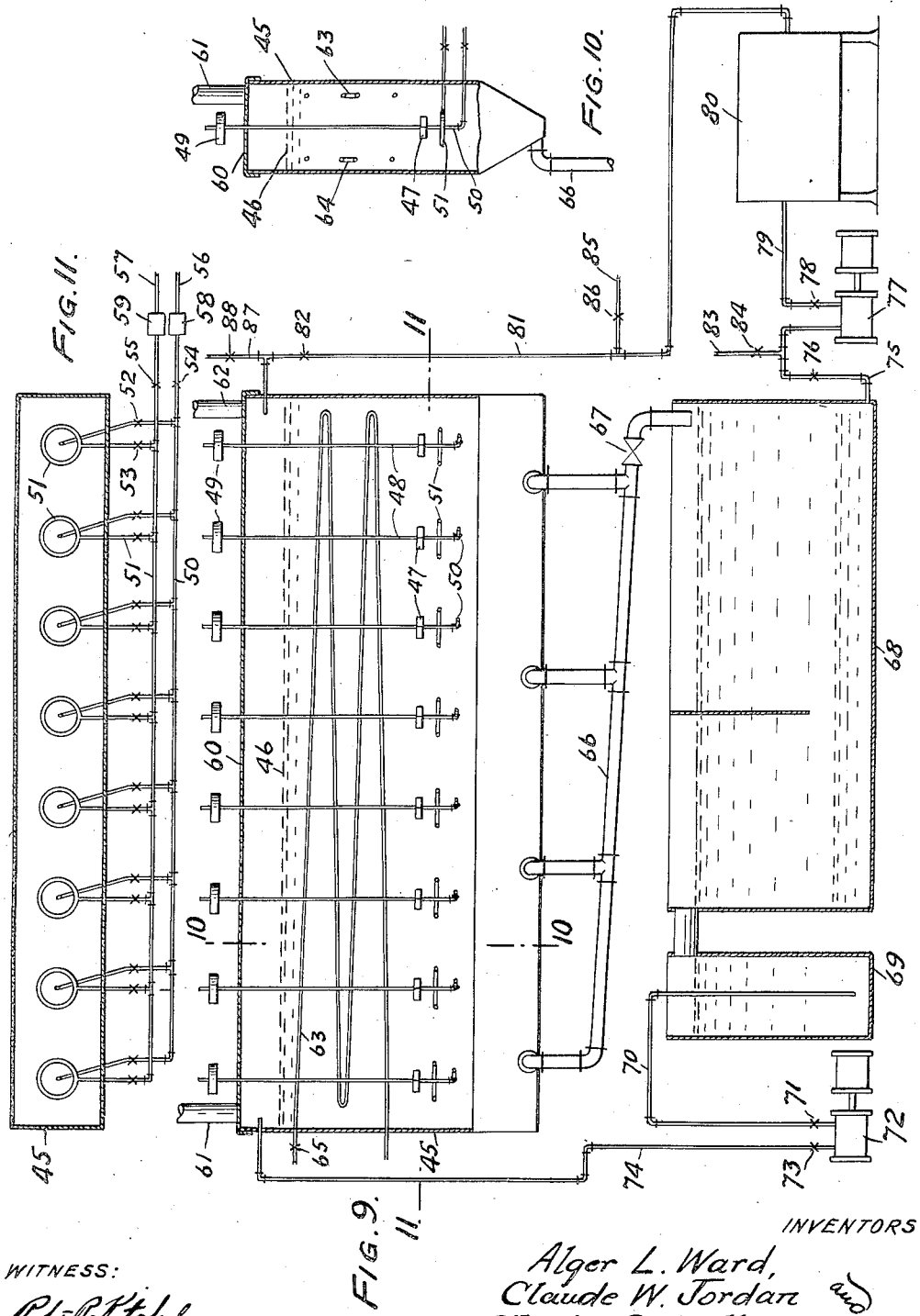

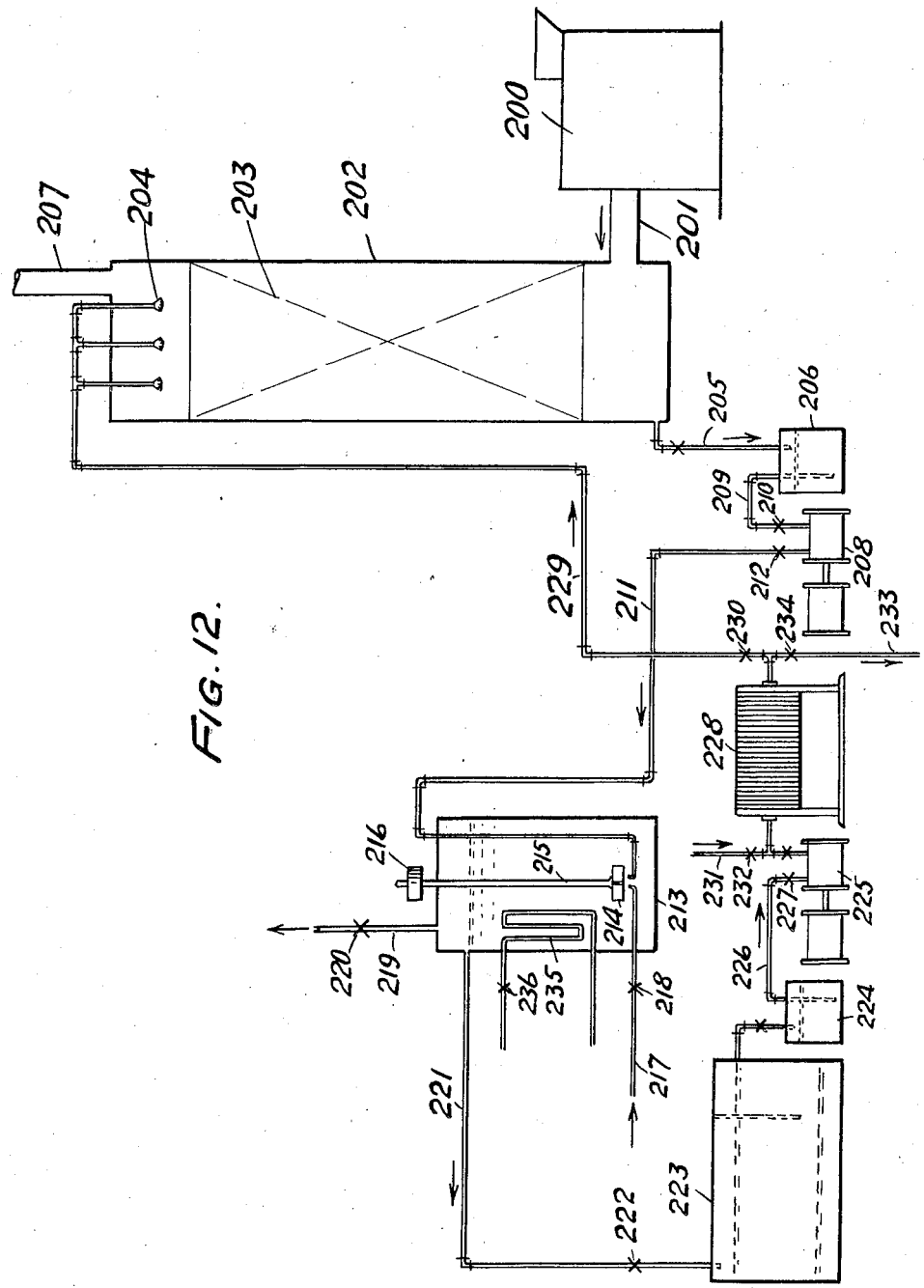

Patented June 2, 1936

2,043,084

UNITED STATES PATENT OFFICE 2,043,084

PRODUCTION OF ELEMENTAL SULPHUR FROM HYDROGEN SULPHIDE AND SULPHUR DIOXIDE

Alger L. Ward, Upper Darby, Claude W. Jordan, Paoli, and Charles G. Milbourne, Lansdowne, Pa., assignors to The United Gas Improvement Company, Philadelphia, Pa., a corporation of Pennsylvania Application January 23, 1933, Serial No. 653,088

9 Claims. (Cl. 23—225)

The present invention relates to the production of elemental sulphur by reaction between hydrogen sulphide and sulphur dioxide.

It is well known that hydrogen sulphide will react with sulphur dioxide to form elemental sulphur. The theoretical equation for the reaction is assumed to be—

$$2H_2S + SO_2 = 3S + H_2O$$

It has been previously proposed to scrub hydrogen sulphide gas with an aqueous solution of sulphur dioxide. The presence of water is highly desirable as it appears to catalyze the reaction and it does not contaminate the sulphur produced. In practical operation, however, in accordance with known methods it has been found very difficult to carry the reaction to approximate completion especially in the presence of diluent gases. As a result it has been considered that a very long time of contact is required between the reacting substances which necessitates relatively large and expensive apparatus per unit of capacity.

The principal object of the present invention is to provide an improved method of effecting the reaction between hydrogen sulphide and sulphur dioxide to form elemental sulphur in accordance with which the reaction may be carried to approximate completion during a relatively short time of contact. A further object of the invention is the provision of apparatus for the performance of the method of the invention.

We have discovered that if hydrogen sulphide gas is beaten into a body or bath of aqueous solution of sulphur dioxide, the desired reaction may be carried to approximate completion in a very short time of contact permitting the use of relatively small and compact apparatus.

In accordance with our invention we maintain a bath or body of aqueous solution of sulphur dioxide in a reaction vessel and introduce hydrogen sulphide gas into the body of the solution and simultaneously beat it into the solution by violent agitation.

The bath or body of solution may be maintained by continuously introducing into it a supply of fresh solution produced extraneous to the reaction vessel or by continuously introducing sulphur dioxide gas into the solution in the reaction vessel and beating it into the solution simultaneously with the hydrogen sulphide gas. In the latter case the two gases may be introduced separately or may be mixed prior to introduction to the solution.

As an example of the performance of our method, a supply of aqueous solution of sulphur dioxide and a supply of hydrogen sulphide gas may be continuously and simultaneously introduced into a body of solution of sulphur dioxide and beneath a relatively small immersed paddle which is rapidly rotated and which beats the gas into the solution, or sulphur dioxide gas and hydrogen sulphide gas may be continuously and simultaneously introduced beneath the immersed and rapidly revolving paddle and the two gases simultaneously beaten into the solution.

Spent solution containing suspended elemental sulphur may be continuously drawn off from the reaction vessel and the sulphur separated therefrom. In case the sulphur dioxide gas is introduced directly to the reaction vessel, the spent solution after separation of the sulphur may be returned directly to the reaction vessel. In case the sulphur dioxide is introduced to the reaction vessel in aqueous solution, the spent solution after separation of the sulphur may be employed for absorbing sulphur dioxide to produce the fresh solution introduced to the vessel.

The invention may be applied to the production of sulphur from pure hydrogen sulphide and sulphur dioxide gases, but usually in practice diluent gases will be present and such diluent gases may be present in large proportion.

As an example of the application of the invention, mention may be made of waste gases containing too large a proportion of hyldrogen sulphide for discharge to atmosphere without nuisance. For instance the waste gas driven off from the foul purifying solution in the so called "Girbotol" process contains a large proportion of hydrogen sulphide, the quantity depending upon the constituency of the gas purified. In the purification of certain oil gases the waste gas may contain 27% hydrogen sulphide. In such a case the sulphur dioxide required for the present process may be obtained by burning a portion of the gas producing sulphur dioxide by the reaction.

$$2H_2S + 3O_2 = 2H_2O + 2SO_2$$

The resultant products of combustion containing sulphur dioxide may be introduced into the solution of sulphur dioxide in the reaction vessel simultaneously with the unburned fraction of the gas containing hydrogen sulphide and the two gases beaten into the solution, the hydrogen sulphide and sulphur dioxide reacting to produce elemental sulphur and the diluent gases passing through the solution and out of the vessel. In such a case, however, in which the sulphur dioxide is accompanied by large quantities of diluent gas, the capacity of the reaction vessel may be increased by scrubbing the sulphur dioxide out of the products of combustion with water and introducing the resultant solution to the reaction vessel instead of the gas containing sulphur dioxide, thus avoiding the passage through the reaction vessel of the diluents in the combustion products.

In applying the invention to the conversion of hydrogen sulphide in gases, which it is not desirable to burn for the production of the necessary sulphur dioxide, this sulphur dioxide may be produced in any suitable manner for instance by burning some of the sulphur produced in the process.

While the method of the present invention is capable of carrying the reaction between the sulphur dioxide and the hydrogen sulphide to approximate completion, it may be desirable to overload the apparatus and operate at lower efficiency and greatly increased capacity.

The co-pending application No. 551,862 of Albert F. Kunberger and Walter H. Fulweiler describes a process according to which a gas containing hydrogen sulphide is contacted with an aqueous solution of sulphur dioxide to remove a portion of the hydrogen sulphide by reaction forming elemental sulphur. The excess of H₂S retards the formation of polythionic acids. The residual hydrogen sulphide is burned producing sulphur dioxide which is scrubbed out of the combustion products with water producing the aqueous solution of sulphur dioxide employed in the first mentioned step.

The method of the present invention may readily be adapted for use in connection with the general method of the above application, by overloading the apparatus so as to convert only approximately two thirds of the hydrogen sulphide leaving one third for combustion to sulphur dioxide. Operating at this lowered efficiency the method of the present invention is capable of providing very great capacities in small apparatus.

The invention will be more particularly described in connection with the accompanying drawings which show forms of the apparatus of the invention, chosen for illustration and in which—

Figure 9 shows a diagrammatic view partially in side elevation and partially in section of a reaction vessel with a plurality of agitators and gas admission means, together with settling tank, pumps and filter press.

Figure 10 shows a like view partially in end elevation and partially in section on line 10—10 of Fig. 9 of the reaction vessel of Figure 9.

Figure 11 shows a horizontal section on line 11—11 of Fig. 9 of the reaction vessel of Figure 9 and Figure 12 shows in partial elevation and partial section apparatus adapted for the introduction of aqueous solution of sulphur dioxide and hydrogen sulphide gas into the reaction vessel.

Figures 1, 2, 3, 4:
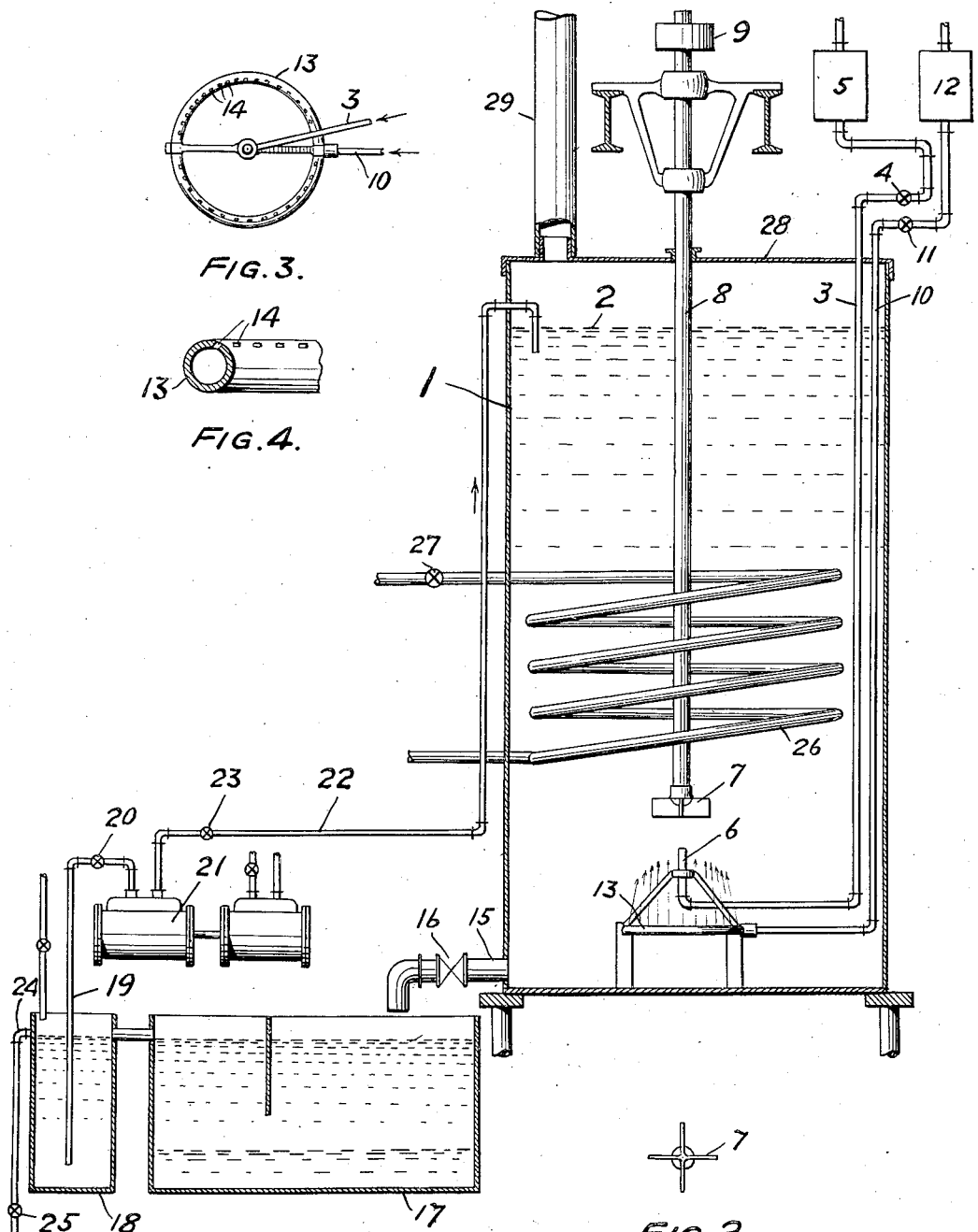
Figure 1 shows a view partially in elevation and partially in section of a reaction vessel provided with an agitator and means for introducing the reacting gases under it, together with accessory apparatus.
Figure 2 shows a plan view of the agitator of Figure 1, from beneath.
Figure 3 shows a plan view of the means of Figure 1 for introducing the gases.
Figure 4 shows an enlarged portion of one of the means for introducing gas, showing the discharge ports.

Referring to Figures 1, 2, 3, and 4, 1 generally indicates the reaction vessel adapted to contain the aqueous solution 2. Hydrogen sulphide gas is supplied to the vessel through the line 3 provided with valve 4 and flow meter 5. The line 3 terminates in an upwardly directed discharge nozzle 6 which is preferably centered under the immersed agitator 7, shown in Figures 1 and 2 as a cruciform paddle with four blades. The agitator is revolved rapidly by shaft 8, power being supplied through pulley 9 or any other appropriate means.

Sulphur dioxide gas is supplied to the vessel through line 10, provided with valve 11 and flow meter 12. Line 11 terminates in a ring 13, provided with a plurality of ports 14, preferably inclined as indicated in Figure 4. The ports 14 discharge upwardly into the solution around and about and converging toward the hydrogen sulphide discharge.

Connection 15, provided with valve 16 leads from the lower portion of the vessel 1 to the sulphur settling tank 17, which overflows into sump 18. Line 19, provided with valve 20, pump 21 and line 22, provided with valve 23, are means for returning solution from the sump to the reaction vessel. Connection 24 provided with valve 25, provides means for bleeding off excess solution if necessary.

The vessel 1 is provided with cooling coil 26, for circulating a cooling medium to control the temperature of the solution. Valve 27 regulates the flow of the cooling medium.

The vessel may be provided with a removable cover 28 and provided with a vent 29 leading to atmosphere or other disposal.

The vessel may be arranged on vertically movable supports so that it may be lowered to give access to the agitator and gas discharge means without disconnecting them.

Settled sulphur may be removed from the tank 17 by any suitable means, as for instance by a pump, discharging through a filter press. Such means are illustrated and described in connection with other figures.

Figure 5:
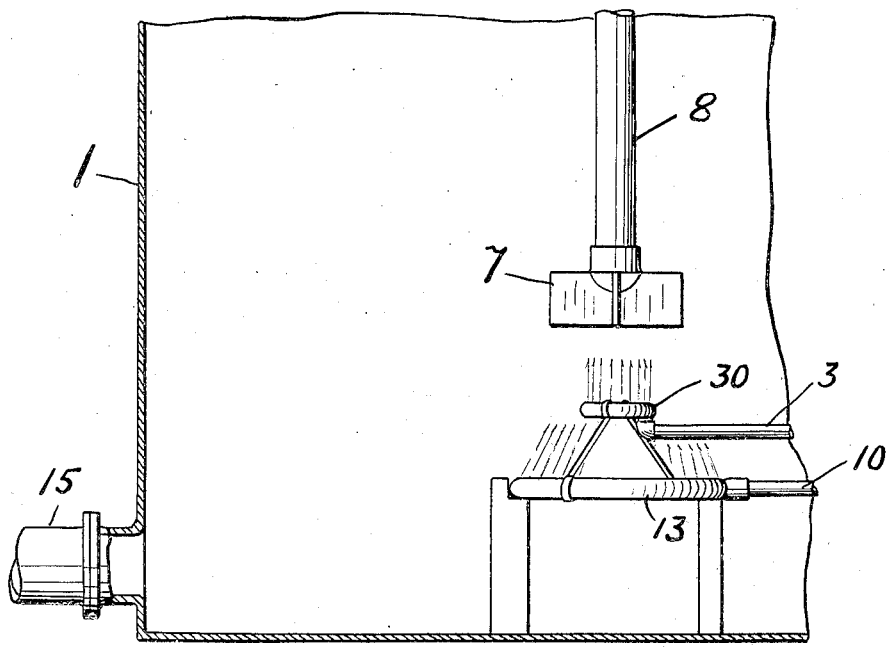
Figure 5 shows a portion of the reaction vessel illustrated in Figure 1, with modified means for introducing the gases.

Referring to Figure 5 this figure shows principally in section a portion of the reaction vessel of Figure 1, with a modified means for discharging the hydrogen sulphide into the solution. The hydrogen sulphide supply line terminates in a small ring 30 provided with upwardly directed ports similar to the ports in the sulphur dioxide ring 13, shown in Figure 3, and located under the agitator 7. Other numbers refer to parts identical with those in Figure 1.

Referring to Figures 6, 7, and 8, 35 indicates the spumer driven by the hollow shaft 36 which is in communication with the hollow arms which discharge through openings 37 into the solution. The spumer is provided with the bottom opening 38 which is also in connection with the openings 37. One of the gases is supplied to the hollow shaft 36 and the other supplied through pipe 39 to the opening 38, both gases being discharged through the openings 37 as the spumer revolves.

Referring to Figures 9, 10, and 11, 45 generally indicates the reaction vessel in the form of an elongated tank adapted to contain the solution 46. 47 indicates one of a plurality of agitators immersed in the solution and driven by shaft 48 by power applied as through pulley 49 or other suitable means. 50 indicates one of a plurality of hydrogen sulphide supply means discharging into the solution under each agitator. 51 indicates one of a plurality of sulphur dioxide supply means discharging into the solution under each agitator. The individual agitators and gas discharge means may be of any of the forms previously illustrated.

A valve as 52 may be provided to control the flow to each hydrogen sulphide discharge means, and a valve as 53 to control the flow to each sulphur dioxide discharge means or the flow may be generally controlled by proper manipulation of valves 54 and 55, in the headers 56 and 57 respectively, the flow being indicated by flow meters 58 and 59.

60 indicates a removable cover provided with vents 61 and 62 leading to atmosphere or other disposal. 63 and 64 indicates an immersed cooling coil with valves as 65 for controlling the flow of the cooling medium.

The solution laden with sulphur is discharged from the lower portion of the vessel 46 through connection 66 provided with valve 67, and leading to the settling tank 68. Tank 68 overflows into sump 69. From the sump the solution is returned to the reaction vessel through line 70, valve 71, pump 72, valve 73 and line 74.

Sulphur sludge may be pumped from the lower portion of the tank 68, through line 75, valve 76, pump 77, valve 78 and line 79 to the filter press 80; the filtered solution returning through line 81 and valve 82 to the reaction vessel. Wash water may be supplied to the press through line 83 and valve 84. Excess solution preferably in the form of weak wash water may be bled off through line 85 and valve 86. Line 87 and valve 88 are means for supplying water to the reaction vessel other than through the pump and filter press.

In operation of the apparatus of Figures 1, 2, 3, and 4, for the practice of the invention the reaction vessel is filled with water and the paddle rotated rapidly. Sulphur dioxide containing gas is admitted alone for a short period, through supply pipe 10 until the solution is slightly acid, then the hydrogen sulphide containing gas is admitted through supply line 3 and the rates of admission of the two gases adjusted by means of the valves 4 and 11 and the flow meters 5 and 12 so that the quantities of hydrogen sulphide and sulphur dioxide admitted in a given time are in the approximate ratio of two parts hydrogen sulphide to one part sulphur dioxide. It may be preferable to have a slight excess of sulphur dioxide over the theoretical requirement, it being less objectionable to discharge a small quantity of sulphur dioxide into the atmosphere than hydrogen sulphide. The rates of gas admission are also adjusted so that little or no sulphur bearing gas passes out of the solution.

The rapidly rotating paddle revolving for instance at 1800 to 2500 R. P. M. beats the gases into the solution and causes a rapid reaction which approaches completion even though a relatively large quantity of gas is passed through a relatively small quantity of solution.

The hydrogen sulphide gas is admitted directly under the paddle through the nozzle 6 and the discharge of hydrogen sulphide is surrounded by the discharge of sulphur dioxide gas from the ports of the ring 13, which acts as further insurance of complete decomposition of the hydrogen sulphide.

Elemental sulphur formed by the reaction is continuously removed from the vessel in suspension in solution drawn off through connection 16 controlled by valve 15, and is passed to the settling tank 17, where the sulphur settles out. The supernatant solution overflows to the sump 18 from which it is returned through lines 19 and 22 by the pump 21. Excess solution caused by the water produced by the reaction may be drawn off at 24 as controlled by valve 25.

The diluent gases introduced with the hydrogen sulphide and sulphur dioxide pass through the solution in the reaction vessel and pass out of the vessel through the vent 29 to atmosphere or other disposal.

Inasmuch as the reaction between the hydrogen sulphide and the sulphur dioxide is exothermic the temperature of the solution in the vessel 1 tends to rise, which is detrimental to the proper carrying out of the reaction. To control the temperature a cooling medium such as cold water or other cooling medium is circulated through the cooling coil 26 the flow being controlled by valve 27. It will be obvious that the solution might be cooled elsewhere in the system outside the reaction vessel.

The sulphur may be removed from the settling tank 17 by any appropriate means and may be washed in any desired method. The means shown and described in connection with subsequent figures are obviously applicable in the case of the apparatus of Figure 1.

Any excess solution is only slightly acid and its discharge as waste results in only a slight loss. It may be run over calcium carbonate or other suitable material to neutralize it before disposal into streams or elsewhere.

We have found that a small reaction vessel will handle a large quantity of gas. For instance employing a generally cylindrical vessel holding approximately 40 gallons of solution, with a small cruciform four blade paddle, with blades approximately 1¾ inches long and ¾ inch deep immersed at a depth of 2 to 3 feet and driven from 1800 to 2450 R. P. M., 412 cu. ft. of gas an hour was passed through the solution, of which 75 cu. ft. was hydrogen sulphide, 37½ cu. ft. sulphur dioxide and 300 cu. ft. diluent gas, recovering upwards of 90% of the sulphur in the gas as elemental sulphur, of 99.8% purity. The power consumption for agitation was approximately .05 kw. per lb. of sulphur recovered.

As an indication of the efficiency of the paddle in beating the gases into the solution and so effecting the reaction, hydrogen sulphide and sulphur dioxide gases were passed into the solution at rates of 50 and 25 cubic feet per hour respectively, together with 200 cubic feet of inert gas per hour. With the paddle immersed at a depth of only 6.5 inches and with the gases admitted to the solution approximately an inch below the paddle, with a conversion efficiency of 93.3%. At 11 inches immersion of the paddle the conversion efficiency was 94.8% and gradually increased with increasing depths of immersion to 97.0% at 28 inches. At zero immersion the conversion efficiency was less than 70%.

The operation of the apparatus of Figure 5 is the same as the apparatus of previous figures, except that the hydrogen sulphide issues into the solution through a plurality of ports in ring 30 instead of through a single jet.

Figure 6:
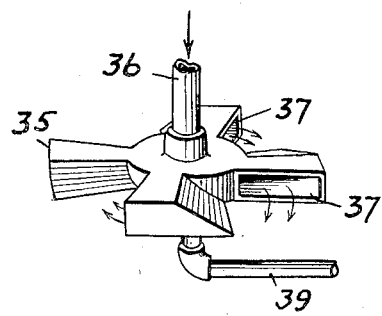
Figure 6 shows a perspective view of a spumer adapted for introducing the reacting gases into the solution.
Figure 7:
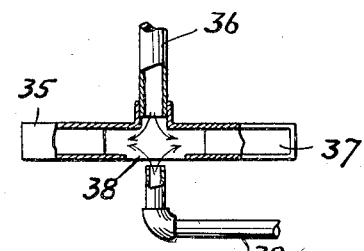
Figure 7 shows a vertical cross section of the spumer of Figure 6.
Figure 8:
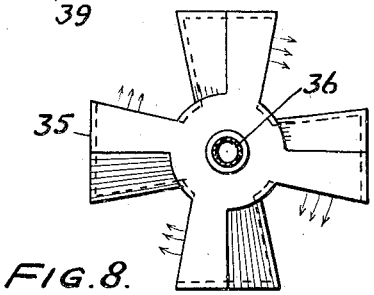
Figure 8 shows a plan view of the spumer of Figure 6.

The operation of the apparatus of Figures 6, 7, and 8 is the same as in previous figures except that a spumer is employed instead of a paddle. One gas is supplied to the spumer through the hollow shaft 36, the other gas is supplied beneath the spumer through pipe 39. As the spumer revolves the two gases are passed out through the hollow arms of the spumer and through the opening 37 into the solution.

In the operation of the apparatus of Figures 9, 10, and 11, hydrogen sulphide containing gas is passed through line 56 as controlled by valve 54 and the flow meter 58 and admitted to the solution through the plurality of discharge pipes 50, discharging into the solution under each of the plurality of immersed paddles 47. Simultaneously sulphur dioxide containing gas is passed through line 57 as controlled by valve 55 and flow meter 59 and admitted to the solution through the plurality of rings 51, discharging into the solution under each paddle. The paddles are rapidly revolved and beat the gases rapidly into the solution, with rapid reaction between the hydrogen sulphide and sulphur dioxide and the formation of elemental sulphur. The diluent gases pass through the vents 61 and 62. Solution laden with suspended sulphur is continuously drawn off from the lower part of the reaction vessel through connection 66 as controlled by valve 67, to the settling tank 68 where some separation of the sulphur takes place by gravity. The supernatant solution overflows to the sump 69 from whence it is continuously pumped by pump 72 through lines 70 and 74 as controlled by valves 71 and 73, back to the reaction vessel.

The sulphur laden sludge is pumped by pump 77 through lines 75 and 79 as controlled by valves 76 and 78 into the filter press 80, where the sulphur is removed from the solution which passes through line 81 back to the reaction vessel.

When the filter press is full, valve 76 is closed and water for washing the filter cake is admitted through connection 83 as controlled by valve 84 and the sulphur cake washed. Wash water and excess solution may be bled from the system through line 85 as may be required, the quantity bled off depending on the setting of valves 82 and 86.

Referring to Fig. 12:

Sulphur for instance some of the sulphur produced in the process is burned in the sulphur burner 200, producing gas containing sulphur dioxide which passes by connection 201 to the scrubber 202. The scrubber is provided with contact material such as grids or Raschig rings indicated at 203. The gas containing sulphur dioxide rises through the packing and is scrubbed with water or weak sulphur dioxide solution supplied through the sprays 204, producing a relatively strong sulphur dioxide solution which flows through connection 205 to the sump 206. The scrubbed combustion gases pass from the scrubber through stack 207.

From the sump 206 the strong solution is pumped by pump 208 through line 209 provided with valve 210 and line 211 provided with valve 212 into the reaction vessel 213 to provide and maintain a body of aqueous solution of sulphur dioxide in that vessel. The reaction vessel is provided with the immersed paddle 214 rapidly rotated by shaft 215, driven by pulley 216. Gas containing hydrogen sulphide is supplied to the reaction vessel through line 217, provided with valve 218 and is admitted beneath the rotating paddle which beats the gas rapidly into the solution. The strong sulphur dioxide solution is also admitted beneath the paddle adjacent to the gas admission and the gas is rapidly beaten into the strong solution, reacting with the sulphur dioxide forming elemental sulphur. The residual gas, which may be substantially free of hydrogen sulphide, passes through the outlet 219 provided with valve 220.

The solution containing elemental sulphur in suspension and greatly reduced in its sulphur dioxide content is drawn off through line 221 provided with valve 222 to the settling tank 223. The supernatant solution from the tank flows to the sump 224, the settled sulphur may be removed by any suitable means. The pump 225 pumps the weak solution through line 226 provided with valve 227 and through the filter press 228 for the removal of unsettled sulphur, the filtrate passing through line 229 provided with valve 230 to the sprays 204 of the scrubber 202. Wash water may be supplied to the press through connection 231 provided with valve 232. Excess weak solution and wash water may be bled off from the system through connection 233 provided with valve 234.

The reaction vessel is provided with the cooling coil 235 provided with valve 236 and through which a cooling fluid is passed to control the temperature in the body of solution. This temperature tends to rise as the reaction between the hydrogen sulphide and sulphur dioxide is exothermic, a high temperature is undesirable as it increases the vapor pressure of the reacting substances.

The specific means shown in previous figures for introducing sulphur dioxide gas into the solution, it is to be understood may be readily adapted for the introduction of aqueous solution of sulphur dioxide, and the specific means shown for agitation in previous figures are equally adaptable for use in connection with the apparatus of Figure 12.

As an example of operation in which sulphur dioxide solution was introduced to the reaction vessel instead of sulphur dioxide gas and in which the hydrogen sulphide was accompanied by large quantities of diluents: 210 cu. ft. of gas per hour containing 10 cu. ft. of hydrogen sulphide and 200 cu. ft. of diluent gas were passed through a body of approximately 40 gals. of aqueous solution of sulphur dioxide in a reaction vessel provided with an immersed cruciform paddle having blades approximately 2 inches long and 1 inch deep and driven at approximately 1,750 R. P. M. The gas was introduced beneath the paddle, fresh sulphur dioxide solution was continuously introduced beneath the paddle at a concentration of .36% sulphur dioxide and spent solution continuously drawn off at a concentration of approximately .07% sulphur dioxide. The solution in the reaction vessel was maintained in the neighborhood of 73° F. The gas passing off from the reaction vessel contained 450 grs. of total hydrogen sulphide and sulphur dioxide and the sulphur removal efficiency from the gas was approximately 89.1% with a power consumption of approximately 450 watts.

Water for filling the reaction vessel may also be admitted through line 87 controlled by valve 88, Fig. 9.

The temperature of the solution is controlled by flowing a cooling medium through the cooling coils 63 and 64 at a controlled rate.

To facilitate settling of the sulphur a small amount of aluminum sulphate or other promotor of settling may be added to the solution.

In the claims the terms hydrogen sulphide and sulphur dioxide gas are intended to include gases containing hydrogen sulphide and sulphur dioxide and also containing diluent gases.

From the standpoint of the efficiency of the reaction it may be preferable to admit the hydrogen sulphide and sulphur dioxide to the solution separately. However from standpoint of ease of control of the proportionate quantities of the two gases admitted in case a plurality of agitators is employed in a single reaction vessel, it may be preferable to mix the two gases in proper proportions prior to introducing them into the solution. In this case the mixture would be admitted under each agitator.

It will be obvious to those skilled in the art that modifications may be made in details of construction, arrangement and procedure without departing from the spirit of the invention which is not limited to such matters or otherwise than the prior art and the appended claims may require.

We claim:

1. The improvement in the process of producing elemental sulphur by reaction between hydrogen sulphide and sulphur dioxide, which comprises passing hydrogen sulphide and sulphur dioxide gas into a bath of aqueous solution and beneath an immersed paddle, and simultaneously rapidly actuating the paddle thereby beating the gases into the solution.

2. The improvement in the process of producing elemental sulphur by reaction between hydrogen sulphide and sulphur dioxide, which comprises passing hydrogen sulphide gas into a bath of aqueous solution and beneath an immersed paddle, simultaneously passing sulphur dioxide gas into the solution at points spaced radially outward from the zone of hydrogen sulphide admission and within the zone of violent agitation of the paddle, and simultaneously actuating the paddle and beating the gases into the solution thereby.

3. The improvement in the process of producing elemental sulphur by reaction between hydrogen sulphide and sulphur dioxide, which comprises passing hydrogen sulphide and sulphur dioxide gas into a bath of aqueous solution through the arms of an immersed spumer, and simultaneously rapidly rotating the spumer beating the gases into the solution.

4. The improvement in the process of reacting hydrogen sulphide and sulphur dioxide in the presence of an aqueous solution, which comprises swirling a portion of a bath of the solution at a submerged portion thereof, and introducing the hydrogen sulphide and sulphur dioxide to substantially the vortex of the swirl.

5. The improvement in the proceess of reacting hydrogen sulphide and sulphur dioxide in the presence of an aqueous solution which consists in swirling a bath of the solution from below the surface upwards and simultaneously injecting hydrogen sulphide and sulphur dioxide in jet form into the vortex of the swirl.

6. The improvement in the process of producing elemental sulphur by reaction between hydrogen sulphide and sulphur dioxide which comprises, applying an agitating force to a localized portion of a bath of aqueous solution, simultaneously admitting hydrogen sulphide and sulphur dioxide gas in jet form to said localized portion, and beating the gases into the solution by said application of agitating force.

7. The improvement in the process of producing elemental sulphur by reaction between hydrogen sulphide and sulphur dioxide which comprises, absorbing sulphur dioxide in water to form an aqueous solution, applying an agitating force to a localized portion of a bath of said aqueous solution, admitting hydrogen sulphide in jet form to said localized portion, and beating said hydrogen sulphide into the solution by said application of agitating force.

8. Apparatus for the production of elemental sulphide by reaction between hydrogen sulphide and sulphur dioxide, which comprises, a reaction vessel for containing a bath of aqueous solution, hydrogen sulphide inlet connections within the bath in said vessel, inlet connections within the bath in said vessel for introducing sulphur dioxide into the vessel, agitating means within the bath in said vessel and adjacent said inlet connections, water inlet means to said bath, outlet means for said aqueous solution from said vessel and above said agitating means, and cooling means within the bath in said vessel.

9. The improvement in the process of producing elemental sulphur by reaction between hydrogen sulphide and sulphur dioxide, which process comprises, agitating a portion of a bath of an aqueous solution containing sulphur dioxide beneath the surface of said bath, and introducing hydrogen sulphide in jet form into the agitated portion of said bath, thereby beating said hydrogen sulphide into the solution by said agitation.

ALGER L. WARD.
CLAUDE W. JORDAN.
CHARLES G. MILBOURNE.